United States Patent
Kurohara

(10) Patent No.: US 9,715,228 B2
(45) Date of Patent: Jul. 25, 2017

(54) NUMERICAL CONTROLLER CAPABLE OF PREVENTING WRONG MACHINING AFTER MACHINING CONDITION CHANGE

(71) Applicant: FANUC Corporation, Minamitsuru-gun, Yamanashi (JP)

(72) Inventor: Yasuyuki Kurohara, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 303 days.

(21) Appl. No.: 14/620,255

(22) Filed: Feb. 12, 2015

(65) Prior Publication Data

US 2015/0227133 A1 Aug. 13, 2015

(30) Foreign Application Priority Data

Feb. 13, 2014 (JP) .................................. 2014-025145

(51) Int. Cl.
*G05B 19/4067* (2006.01)
*G05B 19/4068* (2006.01)

(52) U.S. Cl.
CPC ..... *G05B 19/4067* (2013.01); *G05B 19/4068* (2013.01); *G05B 2219/35295* (2013.01); (Continued)

(58) Field of Classification Search
CPC G05B 19/401; G05B 19/406; G05B 19/4061; G05B 19/4067; G05B 19/4068; G05B 19/4166; G05B 2219/34451; G05B 2219/34457; G05B 2219/37492; G05B 2219/50197
See application file for complete search history.

(56) References Cited

U.S. PATENT DOCUMENTS 4,514,611 A * 4/1985 Matsui ..................... B23H 7/18
219/69.16
5,631,851 A * 5/1997 Tanaka ............... G05B 19/4062
700/174

(Continued)

FOREIGN PATENT DOCUMENTS

CN 102073301 A 5/2011
CN 102221825 A 10/2011

(Continued)

OTHER PUBLICATIONS

Notification of Reasons for Refusal dated Jul. 7, 2015, along with its English-language translation, in corresponding Japanese Patent Application 2014-025145.

(Continued)

*Primary Examiner* — Crystal J Barnes-Bullock
(74) *Attorney, Agent, or Firm* — Drinker Biddle & Reath LLP

(57) ABSTRACT

In restarting automatic operation after a machining program or machining conditions are changed or manual intervention is performed while the automatic operation is suspended, a machining path based on simulated operation is drawn to check the change for correctness. A drawing path of an unmachined part is reconstructed by, for example, recalculating a check drawing path at or behind a program stop position, and the reconstructed drawing path is redrawn.

6 Claims, 4 Drawing Sheets

(52) U.S. Cl.
CPC ............. *G05B 2219/35325* (2013.01); *G05B 2219/36089* (2013.01); *G05B 2219/36099* (2013.01)

(56) References Cited

U.S. PATENT DOCUMENTS

| | | | |
|---|---|---|---|
| 5,831,407 A | 11/1998 | Ouchi et al. | |
| 6,400,998 B1* | 6/2002 | Yamazaki | G05B 19/401 318/568.1 |
| 6,463,358 B1 | 10/2002 | Watanabe et al. | |
| 8,531,149 B2* | 9/2013 | Kataoka | G05B 19/406 318/569 |
| 9,069,347 B2* | 6/2015 | Kettemer | G05B 19/4061 |
| 2002/0031019 A1 | 3/2002 | Nakamura | |
| 2013/0076287 A1 | 3/2013 | Iwashita et al. | |
| 2013/0253670 A1* | 9/2013 | Chung | B23Q 17/0961 700/79 |

FOREIGN PATENT DOCUMENTS

| | | | |
|---|---|---|---|
| EP | 0436039 A1 | | 7/1991 |
| EP | 0889383 A1 | | 1/1999 |
| JP | H03-155486 A | | 7/1991 |
| JP | H04-36039 A | | 2/1992 |
| JP | H04-148305 A | | 5/1992 |
| JP | 07148618 A | * | 6/1995 |
| JP | H07-295619 A | | 11/1995 |
| JP | H07-311612 A | | 11/1995 |
| JP | 2002-091523 A | | 3/2002 |
| JP | 2013-069231 A | | 4/2013 |
| JP | 2014-026430 A | | 2/2014 |

OTHER PUBLICATIONS

Partial European Search Report issued Oct. 13, 2016 in European Patent Application No. 15154791.6.

Extended European Search Report issued Feb. 3, 2017 in European Patent Application No. 15154791.6.

The Notification of the First Office Action issued Jan. 13, 2017 in Chinese Patent Application No. 2015100755097 (6 pages) with an English translation (9 pages).

* cited by examiner

NUMERICAL CONTROLLER CAPABLE OF PREVENTING WRONG MACHINING AFTER MACHINING CONDITION CHANGE

RELATED APPLICATION DATA

This application claims priority under 35 U.S.C. §119 and/or §365 to Japanese Application No. 2014-025145 filed Feb. 13, 2014, the entire contents is incorporated herein by reference.

BACKGROUND OF THE INVENTION

Field of the Invention

The present invention relates to a numerical controller for controlling a machine tool, and more particularly, to a numerical controller capable of preventing wrong machining after a machining condition change.

Description of the Related Art

There is a method in which a machining path is drawn to be checked by simulated operation of a machining program before actual machining is performed by a machine tool. This drawing of the machining path based on the simulated operation is called check drawing. In an actual machining after the check drawing, a current position is displayed on the drawn path so that the machining state can be understood.

Japanese Patent Application Laid-Open No. 2002-91523 discloses an automatic programming technique capable of easily modifying an NC program and starting a simulation based on drawing processing at a modified portion. Further, Japanese Patent Application Laid-Open No. 2013-69231 discloses a technique capable of displaying one or more past feedback trajectories stored in a tool trajectory storage section in a superposed manner and accurately visually analyzing trajectory shape changes before and after a machining condition change.

Normally, check drawing is performed once just before actual machining. If the machining program or machining conditions, including a parameter, correction amount, and machining state, are changed or manual intervention is performed during the actual machining, the machining path may sometimes change thereafter. In such a case, there is a possibility of an operator continuing the operation as it is, thereby causing wrong machining or breakage of a tool, workpiece, etc.

The technique described in Japanese Patent Application Laid-Open No. 2002-91523 is characterized in that the drawing processing is performed as the NC program is modified in programming. According to this technique, therefore, the drawing processing cannot be performed based on a change of conditions during actual machining. On the other hand, the technique described in Japanese Patent Application Laid-Open No. 2013-69231 is characterized in that machining paths executed in two or more different machining conditions are superposed. According to this technique, therefore, the drawing processing cannot be performed in case where an unmachined path changes according to machining conditions.

SUMMARY OF THE INVENTION

Accordingly, the object of the present invention is to provide a numerical controller which can check if change is correct when an automatic operation is restarted after a machining program or machining conditions, including a parameter, correction amount, and machining state, are changed or manual intervention is performed while the automatic operation is suspended.

According to the present invention, when the machining program or programs or machining conditions, including a parameter, correction amount, and machining state, are changed or manual intervention is performed, coordinate values, machining conditions, and block end point coordinate values before and after the program is stopped are compared. If the comparison indicates that the differences between the calculated coordinate values, machining conditions, and end point coordinate values before and after the stop of the program exceed set ranges specified by parameters, an alarm, message, or warning signal is output to notify an operator that a machining path is changed.

According to the present invention, check drawing is performed and a machining path of an unmachined part is redrawn for set values for the case where the machining program or programs or machining conditions, including a parameter, correction amount, and machining state, are changed or manual intervention is performed. Thereupon, an operator can identify the changed machining path.

A first aspect of a numerical controller according to the present invention is configured to analyze a machining program and a machining condition, thereby performing automatic operation. The numerical controller includes: a machining path drawing information creation section configured to create machining path information for drawing based on the machining program and the machining condition at the start of the automatic operation; a machining path drawing information storage section configured to store the machining path drawing information; a machining path display section configured to display a machining path based on the machining path drawing information; a machining path drawing information re-creation section configured, when the automatic operation is restarted after the machining program or the machining condition is changed with the automatic operation suspended during the execution thereof, to re-create machining path information for drawing based on the changed machining program and the changed machining condition; a machining path drawing information re-storage section configured to store the machining path drawing information; and a machining path redisplay section configured to display a machining path based on the re-created machining path drawing information.

A second aspect of the numerical controller according to the present invention is configured to analyze a machining program and a machining condition, thereby performing automatic operation. The numerical controller includes: a machining path drawing information creation section configured to create machining path information for drawing based on the machining program and the machining condition at the start of the automatic operation; a machining path drawing information storage section configured to store the machining path drawing information; a machining path display section configured to display a machining path based on the machining path drawing information; a machining path drawing information re-creation section configured, when the automatic operation is restarted after manual intervention is performed with the automatic operation suspended during the execution thereof, to re-create machining path information from a tool position that is changed by manual intervention; a machining path drawing information re-storage section configured to store the machining path drawing information; and a machining path redisplay section configured to display a machining path based on the machining path drawing information.

The machining path redisplay section may display, as a machining path before the suspension of the automatic operation, a machining path before the machining program or the machining condition is changed, and, on the other hand, may display, as machining paths after the restart of the automatic operation, both machining paths before and after the machining program or the machining condition is changed.

The machining path redisplay section may display, as a machining path before the suspension of the automatic operation, a machining path before the machining program or the machining condition is changed, and, on the other hand, may display, as a machining path after the restart of the automatic operation, a machining path after the machining program or the machining condition is changed.

A third aspect of the numerical controller according to the present invention is configured to analyze a machining program composed of one or more blocks and a machining condition, thereby performing automatic operation. The numerical controller includes: an end point coordinate value analysis section configured to analyze end point coordinate values for all the blocks at the start of the automatic operation; an end point coordinate value storage section configured to store the end point coordinate values for all the blocks analyzed by the end point coordinate value analysis section; an end point coordinate value reanalysis section configured to reanalyze the end point coordinate values for all the blocks when the automatic operation is restarted after the machining program or the machining condition is changed with the automatic operation suspended during the execution thereof; an end point coordinate value re-storage section configured to store the end point coordinate values for all the blocks analyzed by the end point coordinate value reanalysis section; a block end point coordinate value comparison section configured to compare the end point coordinate values for each of the blocks stored by the end point coordinate value storage section with the end point coordinate values for each of the blocks stored by the end point coordinate value re-storage section; and a block end point coordinate value excessive change notification section configured to notify the fact that the change during the suspension of the automatic operation exceeds a preset tolerance if the result of the comparison by the block end point coordinate value comparison section exceeds the tolerance.

A fourth aspect of the numerical controller according to the present invention is configured to analyze a machining program composed of one or more blocks and a machining condition, thereby performing automatic operation. The numerical controller includes: a machining program comparison section configured, when the automatic operation is restarted after the machining program or the machining condition is changed with the automatic operation suspended during the execution thereof, to compare the machining programs before and after the change; a machining condition comparison section configured to compare the machining conditions before and after the change; a machining program change notification section configured to notify the change during the suspension of the automatic operation if the change of the program is determined by the machining condition comparison section; and a machining condition excessive change notification section configured to notify the fact that the change during the suspension of the automatic operation exceeds a preset tolerance if the result of the comparison by the machining condition comparison section exceeds the tolerance.

A fifth aspect of the numerical controller according to the present invention is configured to analyze a machining program composed of one or more blocks and a machining condition, thereby performing automatic operation. The numerical controller includes: a tool position storage section configured to store a tool position during the execution of the automatic operation; a restart tool position storage section configured to store a detected tool position when the automatic operation is restarted after manual intervention is performed with the automatic operation suspended during the execution thereof; a restart tool position comparison section configured to compare the tool position before the suspension of the automatic operation stored by the tool position storage section with the tool position at the restart of the automatic operation stored by the restart tool position storage section; and a tool position excessive change notification section configured to notify the fact that the change of the tool position by the manual intervention during the suspension of the automatic operation exceeds a preset tolerance if the result of the comparison by the restart tool position comparison section exceeds the tolerance.

The machining condition may include a parameter, a correction amount, and/or a machining state.

According to the present invention, a path can be immediately checked by check drawing when an operator changes a machining program or machining conditions, including a parameter, correction amount, and machining state, or performs manual intervention. Further, wrong machining paths can be understood in advance to prevent wrong machining or breakage of a tool, workpiece, etc.

BRIEF DESCRIPTION OF THE DRAWINGS

The above and other objects and features of the present invention will be apparent from the ensuing description of embodiments with reference to the accompanying drawings, in which.

DETAILED DESCRIPTION OF THE PREFERRED EMBODIMENTS

Figure 1:
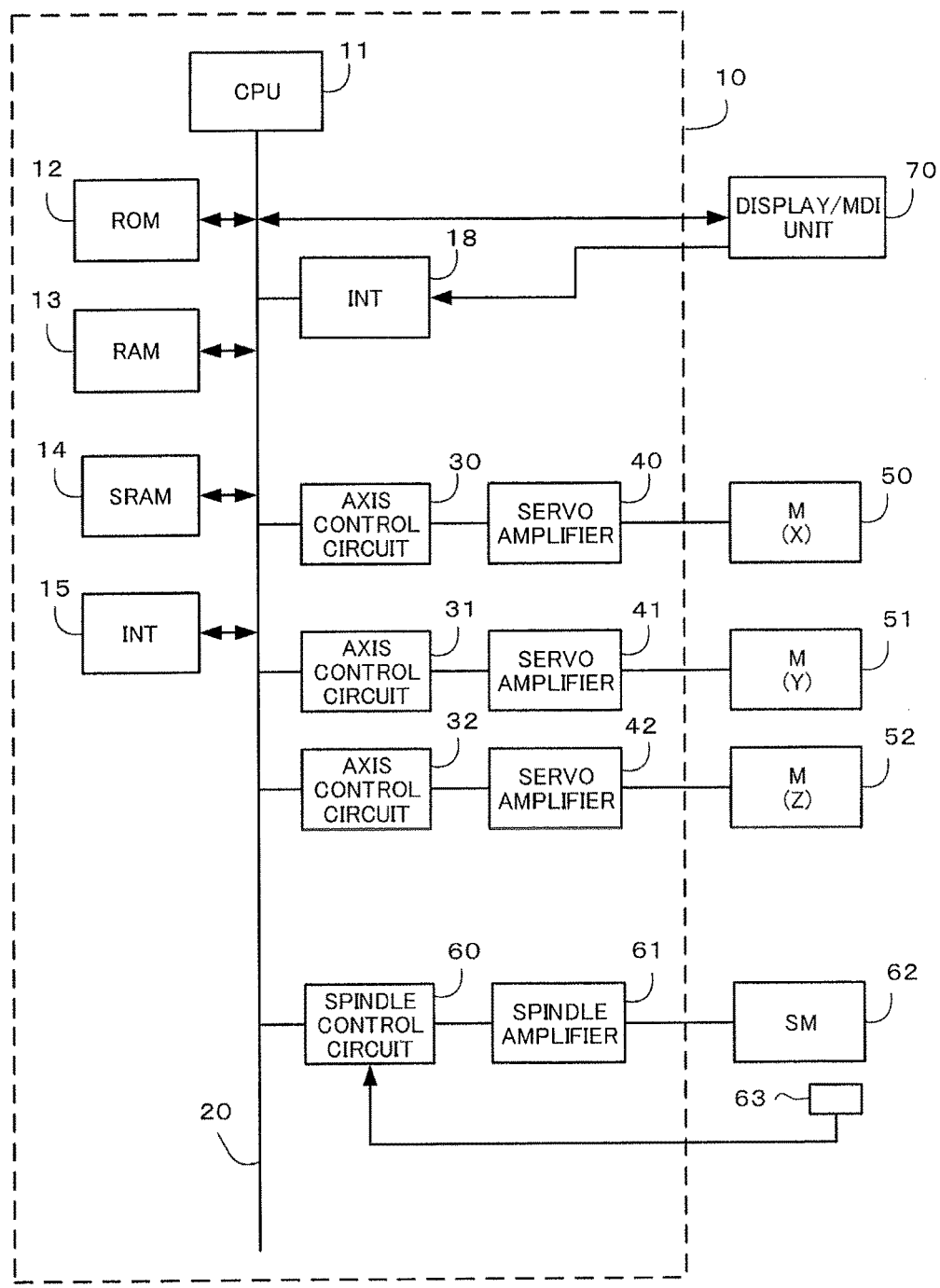
FIG. 1 is a block diagram of a numerical controller capable of preventing wrong machining after a machining condition change.

FIG. 1 is a block diagram of a numerical controller capable of preventing wrong machining after a machining condition change. A CPU 11 reads system programs stored in a ROM 12 through a bus 20 and generally controls a numerical controller 10 according to the read system programs.

A RAM 13 is stored with temporary calculation data, display data, and various data input by an operator through a display/MDI unit 70, directly or via interface 18. As described later, a machining path is displayed on a display device of the display/MDI unit 70.

An SRAM 14 is constructed as a nonvolatile memory that can maintain its storage state even after the numerical controller 10 is switched off. The SRAM 14 can be stored with a machining program read through an interface 15, a machining program input through the display/MDI unit 70, etc. Further, the ROM 12 is preloaded with various system programs for the execution of edit-mode processing required for the creation and editing of the machining programs and processing for automatic operation. In addition, the ROM 12 is stored with a program for the execution of the present invention to prevent wrong machining after a machining condition change.

Axis control circuits 30 to 32 receive move commands for individual axes from the CPU 11 and output them to servo amplifiers 40 to 42. On receiving these commands, the servo amplifiers 40 to 42 drive servomotors 50 to 52 for the axes, respectively. The servomotors 50 to 52 individually incorporate position/speed detectors such that position/speed feedback signals from the position/speed detectors are fed back to the axis control circuits 30 to 32 to perform position/speed feedback control. The position/speed feedback is not illustrated in FIG. 1.

The servomotors 50 to 52 serve to drive X-, Y-, and Z-axes of a machine tool. A spindle control circuit 60 receives a spindle rotation command and outputs a spindle speed signal to a spindle amplifier 61. On receiving the spindle speed signal, the spindle amplifier 61 drives a spindle motor (SM) 62 to rotate at a commanded speed. A speed detector 63 is built in the SM 62 and the rotational speed of the SM 62 is fed back to the spindle control circuit 60.

The following is a description of some aspects of processing for preventing wrong machining after a machining condition change performed by the numerical controller 10 of FIG. 1.

[First Aspect]

When the machining program or programs or machining conditions, including a parameter, correction amount, and machining state, are changed or manual intervention is performed, check drawing is performed and a machining path of an unmachined part is redrawn. Thereupon, the operator can identify the changed machining path.

Figure 2A:
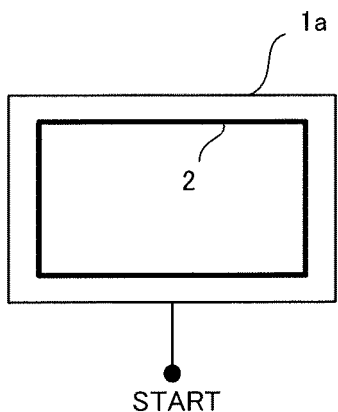
FIGS. 2A and 2B are diagrams showing how check drawing is performed when an operation is restarted after a program is stopped.
Figure 2B:
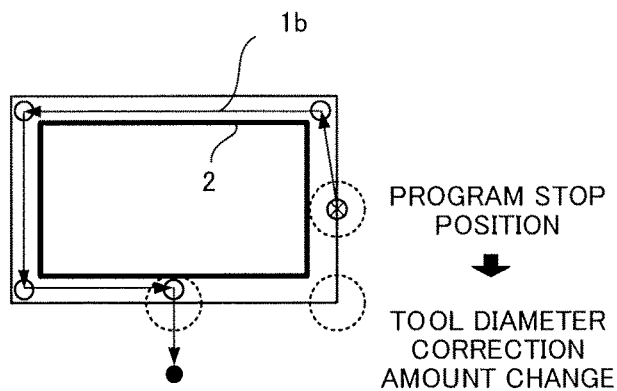

FIGS. 2A and 2B show a first aspect in which the check drawing is performed when an operation is restarted after the program is stopped. FIG. 2A shows a check drawing path before the change of the tool diameter correction amount. FIG. 2B shows the check drawing path after the change of the tool diameter correction amount. In FIGS. 2A and 2B, reference numeral 1a denotes the check drawing path before the change of the tool diameter correction amount, reference numeral 1b denotes the check drawing path after the change of the tool diameter correction amount, and reference numeral 2 denotes a shape to be machined.

If the operator changes the setting of the tool diameter correction amount and the like when the program is stopped, a path different from the check drawing path before the change of setting is drawn. In FIG. 2, the check drawing path after the change of the tool diameter correction amount is drawn in place of the check drawing path before the change of the tool diameter correction amount.

Figure 3:
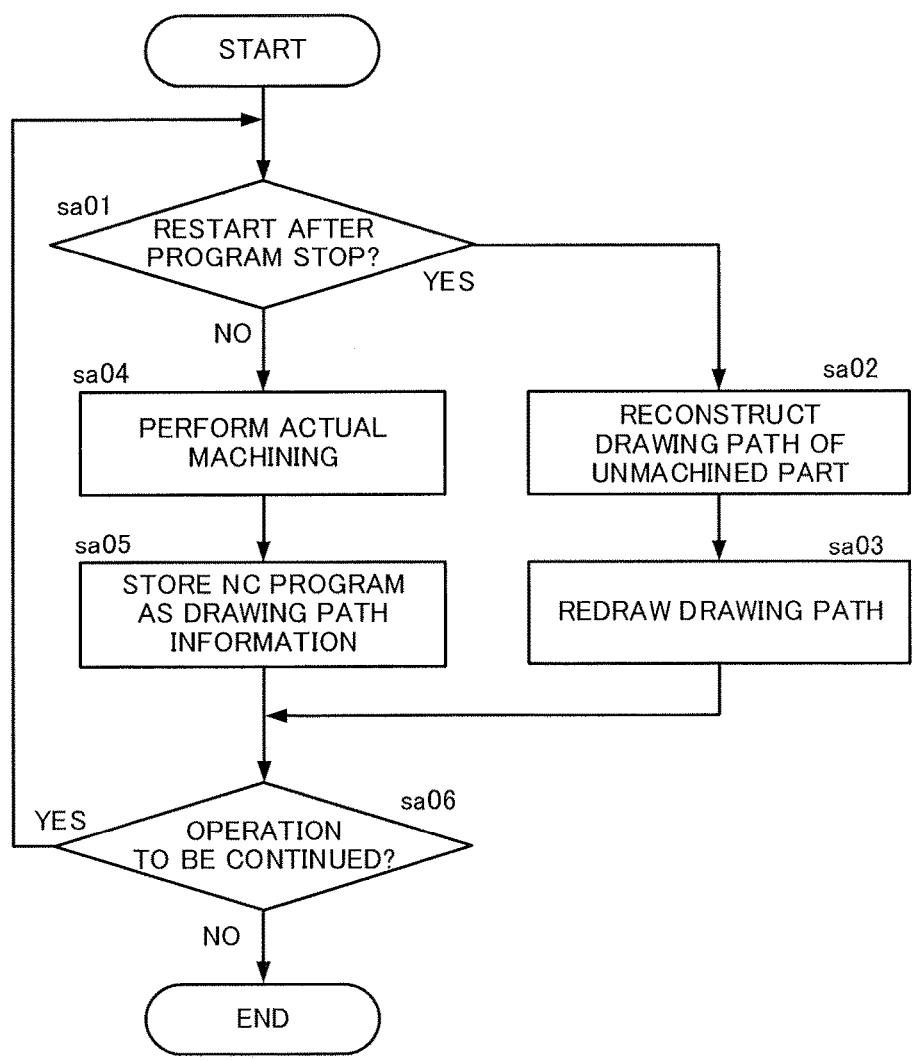
FIG. 3 is a flowchart showing a flow of processing for the check drawing of FIG. 2.

FIG. 3 is a flowchart showing a flow of processing for the check drawing of FIG. 2. The following is a sequential description of steps of this flowchart.

[Step sa01] It is determined whether or not the operation is restarted after the program is stopped. If the operation is restarted after the program is stopped (YES), the processing proceeds to Step sa02. If not (NO), the processing proceeds to Step sa04.

[Step sa02] The drawing path of the unmachined part is reconstructed. For example, the check drawing path at or behind a program stop position in FIG. 2 is recalculated.

[Step sa03] The drawing path is redrawn, whereupon the processing proceeds to Step sa06.

[Step sa04] Actual machining is performed. [Step sa05] An NC program is stored as drawing path information.

[Step sa06] It is determined whether or not to continue the operation. If the operation is to be continued (YES), the processing returns to Step sa01. If not (NO), this processing ends.

[Second Aspect]

This aspect is equivalent to an arrangement in which the stored drawing path information is output at the same time when the check drawing in the first aspect is re-executed. Thus, the operator is allowed to compare the changed machining path with the preceding machining path.

Figure 4:
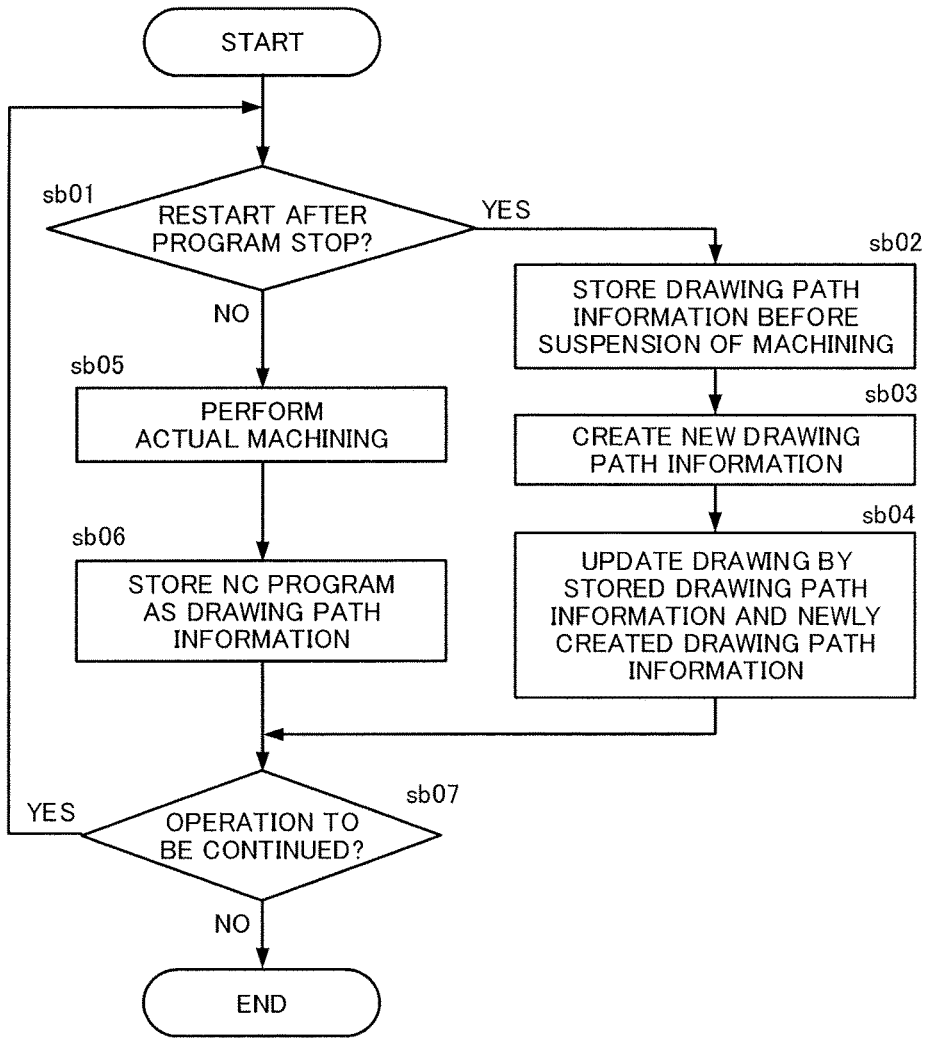
FIG. 4 is a flowchart showing a flow of processing for outputting stored drawing path information simultaneously with re-execution of the check drawing.

FIG. 4 is a flowchart showing a flow of processing for outputting the stored drawing path information simultaneously with the re-execution of the check drawing. The following is a sequential description of steps of this flowchart.

[Step sb01] It is determined whether or not the operation is restarted after the program is stopped. If the operation is restarted after the program is stopped (YES), the processing proceeds to Step sb02. If not (NO), the processing proceeds to Step sb05.

[Step sb02] The drawing path information before suspension of machining is stored.

[Step sb03] New drawing path information is created.

[Step sb04] Drawing is updated based on the stored drawing path information and the newly created drawing path information.

[Step sb05] Actual machining is performed.

[Step sb06] An NC program is stored as drawing path information.

[Step sb07] It is determined whether or not to continue the operation. If the operation is to be continued (YES), the processing returns to Step sb01. If not (NO), this processing ends.

[Third Aspect]

When the machining program or programs or machining conditions, including a parameter, correction amount, and machining state, are changed or manual intervention is performed, coordinate values, machining conditions, and block end point coordinate values before and after the program is stopped are compared. If the comparison indicates that the differences between the calculated coordinate values, machining conditions, and end point coordinate values before and after the stop of the program exceed set ranges specified by parameters, an alarm, message, or warning signal is output to notify the operator that the machining path is changed.

Figure 5:
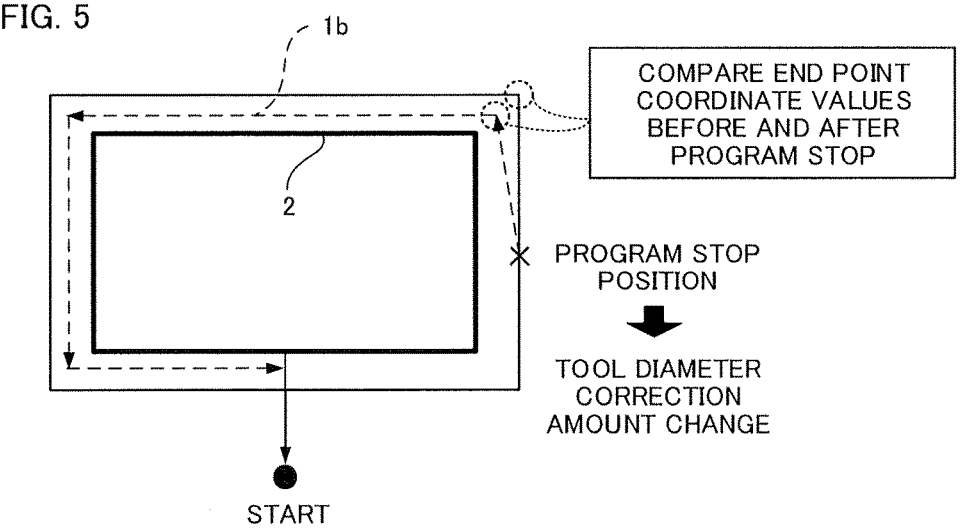
FIG. 5 is a diagram showing how end point coordinate values before and after the stop of the program are compared if an operator changes a tool diameter correction amount while the program is stopped, wherein the operator is notified of a change of a machining path if the result of the comparison exceeds a set range.

FIG. 5 shows a third aspect in which the end point coordinate values before and after the stop of the program are compared if the operator changes the tool diameter correction amount while the program is stopped. If the result of the comparison exceeds a set range, the operator is notified of the change of the machining path by drawing. In FIG. 5, reference numeral 1b denotes the check drawing path after the change of the tool diameter correction amount and reference numerals 2 denotes a shape to be machined.

Figure 6:
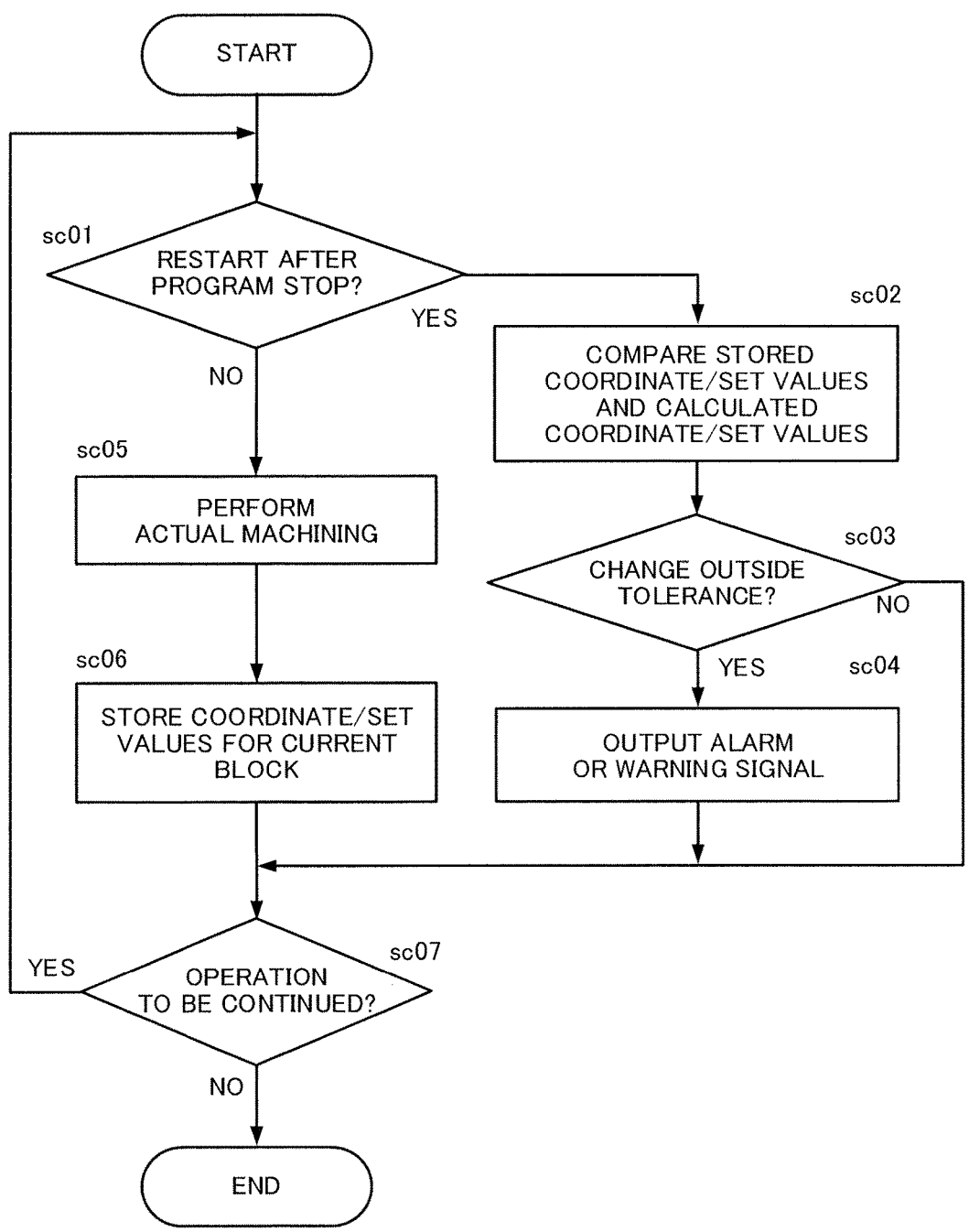
FIG. 6 is a flowchart showing a flow of processing for the drawing of FIG. 5.

FIG. 6 is a flowchart showing a flow of processing for the drawing of FIG. 5. The following is a sequential description of steps of this flowchart.

[Step sc01] It is determined whether or not the operation is restarted after the program is stopped. If the operation is restarted after the program is stopped (YES), the processing proceeds to Step sc02. If not (NO), the processing proceeds to Step sc05.

[Step sc02] Stored coordinate/set values and calculated coordinate/set values are compared.

[Step sc03] It is determined whether or not the change is outside a tolerance. If the change is outside the tolerance (YES), the processing proceeds to Step sc04. If not (NO), the processing proceeds to Step sc07.

[Step sc04] An alarm or a warning signal is output.

[Step sc05] Actual machining is performed.

[Step sc06] Coordinate/set values for the current block are stored.

[Step sc07] It is determined whether or not to continue the operation. If the operation is to be continued (YES), the processing returns to Step sc01. If not (NO), this processing ends.

The invention claimed is:

1. A numerical controller which analyzes a machining program composed of one or more blocks and a machining condition, thereby performing automatic operation, the numerical controller comprising:
    an end point coordinate value analysis section configured to analyze end point coordinate values for all the blocks at the start of the automatic operation;
    an end point coordinate value storage section configured to store the end point coordinate values for all the blocks analyzed by the end point coordinate value analysis section;
    an end point coordinate value reanalysis section configured to reanalyze the end point coordinate values for all the blocks when the automatic operation is restarted after the machining program or the machining condition is changed with the automatic operation suspended during the execution thereof;
    an end point coordinate value re-storage section configured to store the end point coordinate values for all the blocks analyzed by the end point coordinate value reanalysis section;
    a block end point coordinate value comparison section configured to compare the end point coordinate values for each of the blocks stored by the end point coordinate value storage section with the end point coordinate values for each of the blocks stored by the end point coordinate value re-storage section; and
    a block end point coordinate value excessive change notification section configured to notify the fact that the change during the suspension of the automatic operation exceeds a preset tolerance if the result of the comparison by the block end point coordinate value comparison section exceeds the tolerance.

2. A numerical controller which analyzes a machining program composed of one or more blocks and a machining condition, thereby performing automatic operation, the numerical controller comprising:
    a machining program comparison section configured, when the automatic operation is restarted after the machining program or the machining condition is changed with the automatic operation suspended during the execution thereof, to compare the machining programs before and after the change;
    a machining condition comparison section configured to compare the machining conditions before and after the change;
    a machining program change notification section configured to notify the change during the suspension of the automatic operation if the change of the program is determined by the machining condition comparison section; and
    a machining condition excessive change notification section configured to notify the fact that the change during the suspension of the automatic operation exceeds a preset tolerance if the result of the comparison by the machining condition comparison section exceeds the tolerance.

3. A numerical controller which analyzes a machining program composed of one or more blocks and a machining condition, thereby performing automatic operation, the numerical controller comprising:
    a tool position storage section configured to store a tool position during the execution of the automatic operation;
    a restart tool position storage section configured to store a detected tool position when the automatic operation is restarted after manual intervention is performed with the automatic operation suspended during the execution thereof;
    a restart tool position comparison section configured to compare the tool position before the suspension of the automatic operation stored by the tool position storage section with the tool position at the restart of the automatic operation stored by the restart tool position storage section; and
    a tool position excessive change notification section configured to notify the fact that the change of the tool position by the manual intervention during the suspension of the automatic operation exceeds a preset tolerance if the result of the comparison by the restart tool position comparison section exceeds the tolerance.

4. The numerical controller according to claim 1, wherein the machining condition includes a parameter, a correction amount, and/or a machining state.

5. The numerical controller according to claim 3, wherein the machining condition includes a parameter, a correction amount, and/or a machining state.

6. The numerical controller according to claim 5, wherein the machining condition includes a parameter, a correction amount, and/or a machining state.

* * * * *